United States Patent [19]

Knelson

[11] Patent Number: 5,230,797
[45] Date of Patent: Jul. 27, 1993

[54] CENTRIFUGE BOWL WITH ATTACHED CAST INNER LINER

[76] Inventor: Benjamin V. Knelson, 20313-86th Avenue RR #11, Langley, B.C., Canada, V3A 6Y3

[21] Appl. No.: 804,920

[22] Filed: Dec. 11, 1991

[51] Int. Cl.⁵ .................. B04B 7/08; B04B 7/18; B01D 33/27
[52] U.S. Cl. .................. 210/380.1; 210/381; 209/453; 209/486; 209/506; 494/28; 494/29; 494/45; 494/80; 264/269; 264/273; 264/274
[58] Field of Search .............. 210/380.1, 381; 494/27, 494/28, 29, 45, 80, 81; 209/453, 486, 506; 264/268, 269, 270, 267, 273, 274

[56] References Cited

U.S. PATENT DOCUMENTS

| | | | |
|---|---|---|---|
| 917,123 | 4/1909 | Peck | 494/29 |
| 981,679 | 1/1911 | Peck | 494/29 |
| 1,011,078 | 12/1911 | Peck | 494/29 |
| 1,012,097 | 12/1911 | Peck | 494/29 |
| 1,594,501 | 8/1926 | Eccleston | 494/29 |
| 1,853,249 | 4/1932 | Ainley | 209/453 |
| 4,119,542 | 10/1978 | Yamaoka | 210/380.1 |
| 4,130,479 | 12/1978 | Schiele | 210/380.1 |
| 4,608,040 | 8/1986 | Knelson . | |
| 4,776,833 | 10/1988 | Knelson . | |
| 4,983,156 | 1/1991 | Knelson | 494/28 |

FOREIGN PATENT DOCUMENTS 878339  11/1981  U.S.S.R. ............................. 209/453

Primary Examiner—Stanley S. Silverman
Assistant Examiner—Thomas M. Lithgow
Attorney, Agent, or Firm—Adrian D. Battison; Stanley G. Ade; Murray E. Thrift

[57] ABSTRACT

A centrifuge bowl of the type having a shell including a peripheral wall and a cast inner liner attached to the inside surface of the peripheral wall is modified by the provision of a plurality of punched channel portions which extend inwardly into the bowl from peripheral wall to define a U-shaped channel with severed ends. During the casting process the casting plastics material extends into the recess behind each channel portion and thus when set forms an insert portion which anchors the liner to the channel portion and thus to the peripheral wall. Openings for the entry of fluidizing water are then drilled through the insert portion from the outside of the shell through one end of the channel portion and through the liner into the interior of the bowl.

1 Claim, 3 Drawing Sheets

CENTRIFUGE BOWL WITH ATTACHED CAST INNER LINER

FIELD OF THE INVENTION

This invention relates to a centrifuge bowl of a centrifugal separator including a peripheral wall of the bowl which is formed from a rigid supporting material and surrounding an axis of the bowl about which the bowl can rotate to centrifuge materials carried on the peripheral wall together with a cast inner liner carried by and attached to the peripheral wall for rotation therewith.

BACKGROUND OF THE INVENTION

One embodiment of a centrifugal separator is shown in U.S. Pat. No. 4,776,833 of the present inventor which is issued on 11 Oct. 1988. This patent shows a centrifugal bowl of the above type in which there is an outer liner of metal upon which is cast an inner liner of a plastics material which is formed on the inner surface to define grooves extending peripherally around the bowl.

In order to communicate water into the bowl from the outside surface of the peripheral wall through the peripheral wall into the base of the grooves, a plurality of holes are drilled which extend angularly around the bowl so as to tend to inject the water in an angular direction around each groove. One technique for the formation of this angularly extending hole or duct is shown in the patent in which a portion of the peripheral wall is punched inwardly to form an indent which is substantially triangular shaped in plan view. Subsequently the liner is cast on the inside surface of the punched bowl and then the hole is drilled along one side of the triangular shaped punched indent breaking out through a second side of the triangular indent through the peripheral wall into the plastics material of the liner and through the plastics material of the liner to the inner surface for communicating the water from the indent into the bowl.

It is stated in the patent that the cast plastics material is permanently attached to the shell by the natural bonding effect and by the punched indents or depressions. In this embodiment however the punched indents simply form a roughening of the surface of the bowl to assist in the adhesive or frictional effect holding the liner attached to the shell.

However in practice is has been found that the natural bonding effect and the simple frictional effect of the punched depressions is insufficient to hold the liner permanently attached to the bowl, particularly bearing in mind the very large forces that are involved in the rotation of the bowl and also bearing in mind the different coefficients of thermal expansion of the plastics material and the shell which tend to cause a separation of the liner from the shell.

In practice, therefore, it has been necessary until now to weld onto the inside surface of the bowl a number of metal bars which assist in holding the liner properly attached to the shell since they extend sufficiently deeply into the liner to prevent separation from the shell.

However this technique is inefficient and undesirable since it requires the addition to the bowl of further material which increases the weight and also is an additional process causing further expense. Furthermore the bars themselves are a simple and inefficient technique for attachment to the liner and therefore the size of the bars has to be relatively large to obtain the attachment necessary.

SUMMARY OF THE INVENTION

It is an object of the present invention, therefore, to provide an improved arrangement of a centrifugal bowl of the above general type in which the attachment of the liner to the shell is obtained in a more effective manner.

It is a further object of the present invention, to provide a centrifuge bowl comprising an outer shell formed from a rigid supporting material including a peripheral wall surrounding an axis of the bowl about which the bowl can rotate to centrifuge materials carried on the peripheral wall, and an inner liner of a cast plastics material mounted on the peripheral wall for rotation therewith, means defining a plurality of ducts through the peripheral wall each communicating from an open mouth at an inner surface of the liner to an open mouth at an outer surface of the peripheral wall, and a plurality of attachment means for attachment of the inner liner to the peripheral wall, each attachment means comprising a portion of the peripheral wall which is punched inwardly of the peripheral wall towards the axis, said portion defining a U-shaped channel having a base and two legs with the base of the U-shape facing inwardly and the legs of the U-shape integrally attached to the peripheral wall, ends of the channel being open by a severing of the material of the peripheral wall at the ends of the portion, and an insert portion of the cast plastics material of the inner liner which is integral with the inner liner and which extends from the inner liner on the inner surface of the peripheral wall through the ends of the channel and along the channel such that the insert portion lies exteriorly of the portion of the peripheral wall, each of at least some of said ducts extending through the insert portion generally longitudinal of the channel and through one of the ends of the channel.

One embodiment of the present invention will now be described in conjunction with the accompanying drawings in which:

BRIEF DESCRIPTION OF THE DRAWINGS

In the drawings like characters of reference indicate corresponding parts in the different FIGURES.

DETAILED DESCRIPTION

Figure 1:
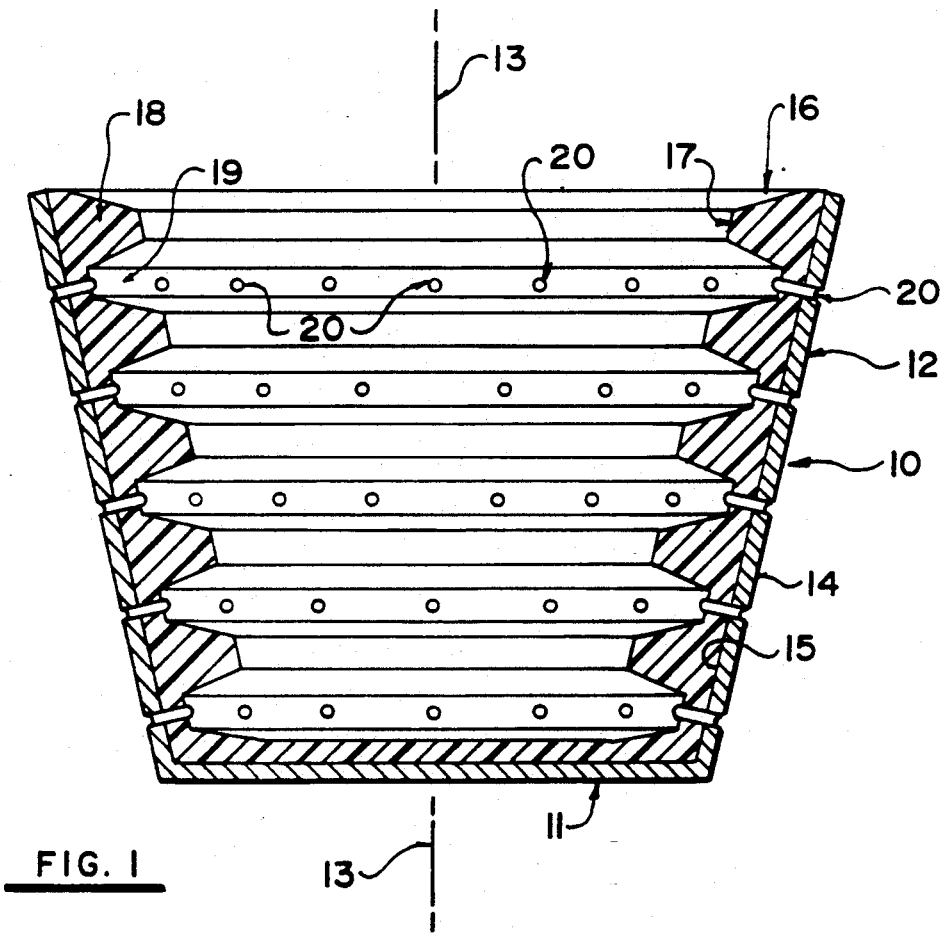
FIG. 1 is a vertical cross sectional view through a centrifugal bowl of the general type to which the present invention is concerned.
Figure 2:
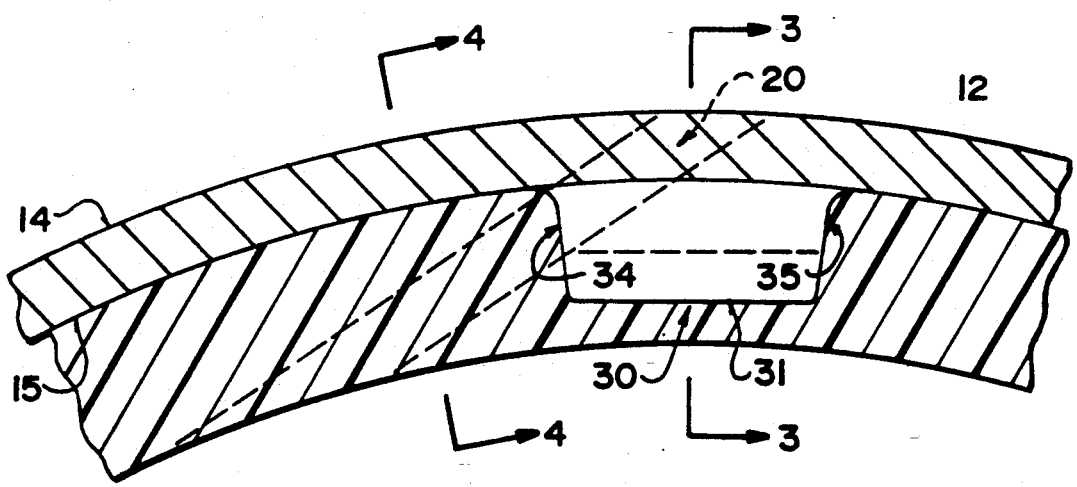
FIG. 2 is a cross sectional view through one portion of the bowl of FIG. 1, the cross section being taken along the lines 2—2 of FIG. 3.

A centrifuge bowl of the type shown in U.S. Pat. No. 4,776,833 is shown in cross section in FIG. 1. The remainder of the centrifuge separator apparatus is not shown as details of this device are shown in the above patent and are known to one skilled in the art.

Basically the bowl comprises an outer shell 10 having a base 11 and a peripheral wall 12 for rotation about a central axis 13 of the bowl. The shell has an outer surface 14 and an inner surface 15 and on the inner surface 15 is cast an inner layer or liner 16 of a cast plastics material. The plastics material is cast in place within the bowl and an inside surface 17 of the liner is shaped by a mould to provide a required inside surface shape. In the example shown the inside surface is moulded to define annular rings 18 and recesses 19 which are arranged alternatively along the height of the peripheral wall for collection of material within the recesses with lighter materials tending to pass over the rings 18 to discharge from the mouth of the bowl during the centrifuge process.

A plurality of openings or ducts 20 are formed in the bowl so as to extend through the shell 10 at the peripheral wall 12 and through the inner liner 16 at the base of each of the recesses 19 to allow the injection of water from the outside of the bowl into the recesses for fluidization of the material as is fully explained in the above patent.

The formation of the shell and the manner of attachment of the cast in a liner to the shell is shown in FIGS. 2 through 6. In those FIGURES the location of one of the openings 20 is shown in enlarged cross sectional view but it will be appreciated that each of the openings is of the construction shown in FIGS. 2 through 6 and thus the inner liner is attached to the shell at each of the opening locations.

Specifically at each intended opening location, the wall is punched using a substantially cylindrical punch body which forms a channel portion 30 which projects from the peripheral wall to the inside of the peripheral wall towards the axis 13. The channel portion 30 is shown in cross section in FIG. 5 and in end elevation of view in FIG. 4 and is generally U-shaped with a base 31 projecting inwardly into the bowl and two legs 32 and 33 extending from the base toward the wall 12 and formed integrally with the wall 12 by the deformation obtained by the action of the punch on the wall 12. The ends of the channel portion 30 are severed from the material of the wall so as to form a substantially D-shaped opening 34, 35 at respective ends of the channel portion.

Figure 4:
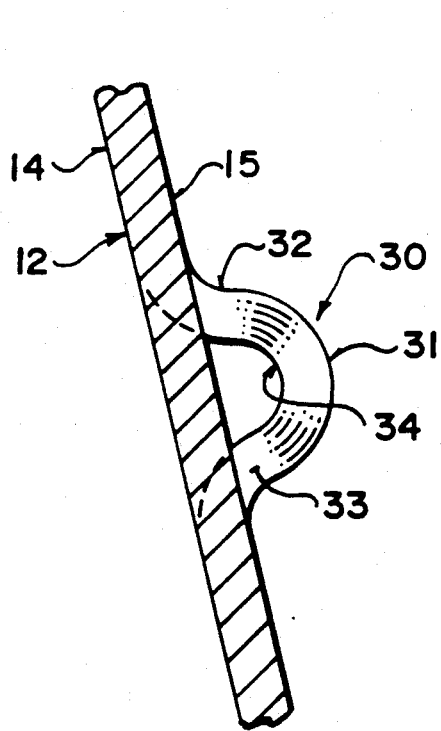
FIG. 4 is a cross sectional view along the lines 4—4 of FIG. 2, the cross section being taken prior to the casting of the inner liner so as to show only the structure of the outer shell.
Figure 5:
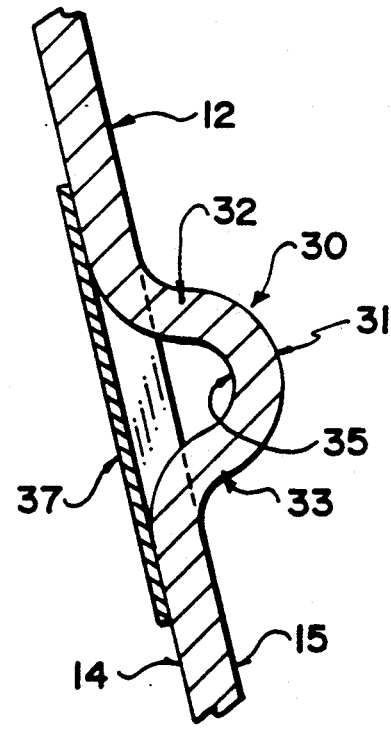
FIG. 5 is a cross sectional view along the lines 3—3 of FIG. 2 again showing only the outer shell prior to the casting of the inner liner.

Subsequent to the formation of the punched channel portion as shown in FIG. 4, a tape element 37 is applied across the recess thus formed on the outer side of the portion 30. The tape thus covers the recess and lies flushed with the outer surface 14 of the wall 12.

Figure 3:
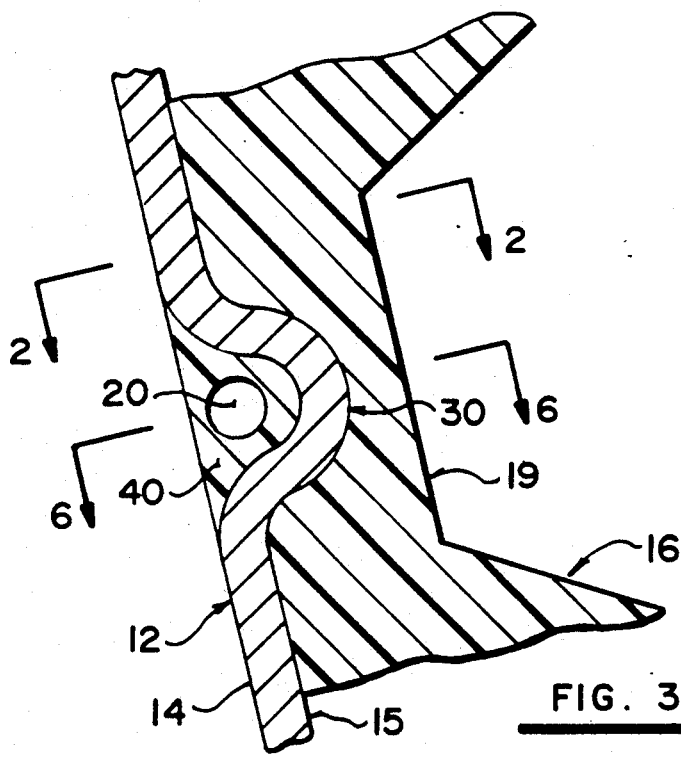
FIG. 3 is a cross sectional view along the lines 3—3 of FIG. 2.
Figure 6:
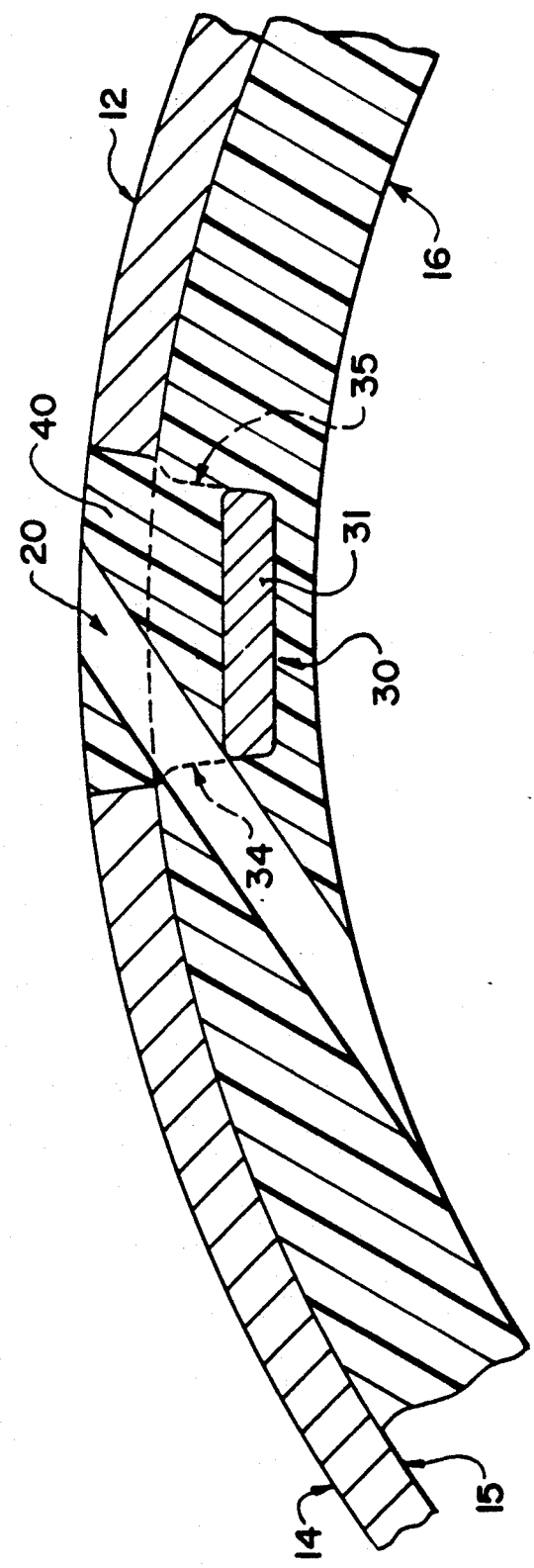
FIG. 6 is a cross sectional view along the lines 6—6 of FIG. 3.

After the tape elements 37 are applied over each of the recesses thus formed, the inner layer of the cast plastics material is formed on the inside surface of the bowl by a conventional casting or moulding action. As the channel portion 30 has open ends 34 and 35 by the severing of the material of the wall, the plastics material during the casting action passes through the openings 34 and 35 and thus fills the recess rearwardly of the channel portion to form an insert portion 40 which fills the recess rearwardly of the channel portion 30 to a position flush with the outer surface 14 of the wall as best shown in FIG. 6. This insert portion 40 therefore acts to grasp around the punched portion 30 and is of course integral with the remainder of the liner 16 thus physically attaching the liner 16 to the shell at the punched portion 30. This position is best shown in FIGS. 3 and 6.

Subsequent to the completion of the casting of the material, the ducts or openings 20 are formed by drilling through the insert portion 40, through the end 34 of the channel portion and through the thickness of the liner 16 at the base of one of the recesses 19. The duct 20 is thus inclined to a radius of the axis 13 but all of the ducts 20 of one of the recesses 19 lie in a radial plane of the axis 13.

In this way the punched channel portion 30 and the insert portion 40 thus formed during the casting process serve two purposes. Firstly they cooperate to anchor the liner 16 to the shell at each of the openings 20. Secondly they provide a location for receiving the opening 20 which can be simply drilled through the relatively soft plastics material while the drilling action occurs at an angle to the surface which otherwise would be difficult if drilled through metal.

Since various modifications can be made in my invention as hereinabove described, and many apparently widely different embodiments of same made within the spirit and scope, it is intended that all matter contained in the accompanying specification shall be interpreted as illustrative only and not in a limiting sense.

I claim:

1. A centrifuge bowl comprising an outer shell formed from a rigid supporting material, said shell including a bowl shaped peripheral wall having inner and outer surfaces and said shell further having an axis about which the shell is rotatably mounted to centrifuge materials carried therein, and an inner liner of a cast plastics material mounted on the inner surface of said peripheral wall for rotation therewith, said liner having an inner surface defining the inside surface of the bowl and an outer surface mounted to the inner surface of said peripheral wall, said wall and liner comprising means defining a plurality of ducts through the peripheral wall and liner each communicating from an open mouth at an inner surface of the liner to an open mouth at an outer surface of the peripheral wall, and a plurality of attachment means for attachment of the inner liner to the peripheral wall, each attachment means comprising a portion of the peripheral wall which is punched inwardly of the peripheral wall towards the axis, said portion defining a U-shaped channel having a base and two legs with the base of the U-shape facing inwardly and the legs of the U-shape integrally attached to the peripheral wall, ends of the channel being open by a severing of the material of the peripheral wall at the ends of the portion, and an insert portion of the cast plastics material of the inner liner which is integral with the inner liner and which extends from the inner liner on the inner surface of the peripheral wall through the ends of the channel and along the channel such that the insert portion lies exteriorly of the portion of the peripheral wall, each of at least some of said ducts extending through the insert portion generally longitudinal of the channel and through one of the ends of the channel.

* * * * *